United States Patent
Gao et al.

(10) Patent No.: US 9,983,731 B2
(45) Date of Patent: May 29, 2018

(54) SYSTEM AND METHOD FOR REDUCING SHADOW EFFECTS IN TOUCH SYSTEMS

(71) Applicant: QUALCOMM Incorporated, San Diego, CA (US)

(72) Inventors: Qiang Gao, San Diego, CA (US); William Yee-Ming Huang, Vista, CA (US); Hsun Wei David Wong, San Diego, CA (US); Teresa Ka Ki Ng, San Diego, CA (US); Rex Wang, San Diego, CA (US); Carol King Mui Law, San Diego, CA (US); Suhail Jalil, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 521 days.

(21) Appl. No.: 14/621,042

(22) Filed: Feb. 12, 2015

(65) Prior Publication Data
US 2015/0242052 A1    Aug. 27, 2015

Related U.S. Application Data

(60) Provisional application No. 61/943,181, filed on Feb. 21, 2014.

(51) Int. Cl.
G06F 3/041 (2006.01)
G06F 3/044 (2006.01)

(52) U.S. Cl.
CPC ........... *G06F 3/0418* (2013.01); *G06F 3/044* (2013.01)

(58) Field of Classification Search
CPC .................................................. G06F 3/0418
See application file for complete search history.

(56) References Cited

U.S. PATENT DOCUMENTS

| 8,542,217 B2 | 9/2013 | Wassvik et al. |
| 8,638,320 B2 | 1/2014 | Harley et al. |
| 2008/0094356 A1* | 4/2008 | Ording ............... G06F 3/04886 345/157 |
| 2009/0085881 A1 | 4/2009 | Keam |
| 2011/0096011 A1 | 4/2011 | Suzuki |
| 2011/0221701 A1 | 9/2011 | Zhang et al. |
| 2013/0176271 A1 | 7/2013 | Sobel et al. |
| 2013/0176274 A1 | 7/2013 | Sobel et al. |
| 2013/0176275 A1 | 7/2013 | Weaver et al. |
| 2013/0265263 A1* | 10/2013 | Westerman .......... G06F 3/0235 345/173 |
| 2015/0346895 A1* | 12/2015 | Bokma ................. G06F 3/0416 345/173 |

OTHER PUBLICATIONS

International Search Report and Written Opinion—PCT/US2015/015924—ISA/EPO—dated Apr. 22, 2015.

* cited by examiner

*Primary Examiner* — William Boddie
*Assistant Examiner* — Andrew Schnirel
(74) *Attorney, Agent, or Firm* — Knobbe, Martens, Olson & Bear, LLP

(57) ABSTRACT

Systems, methods, and devices for reducing shadow effects in touch systems are contained herein. In one aspect, a method of reducing shadow effects in a touch system is disclosed. The method includes receiving a touch input on a touch interface, determining a difference between a weighted mean of the touch input and an arithmetic mean of the touch input and adjusting an estimated touch position of the touch input based on the difference.

28 Claims, 9 Drawing Sheets

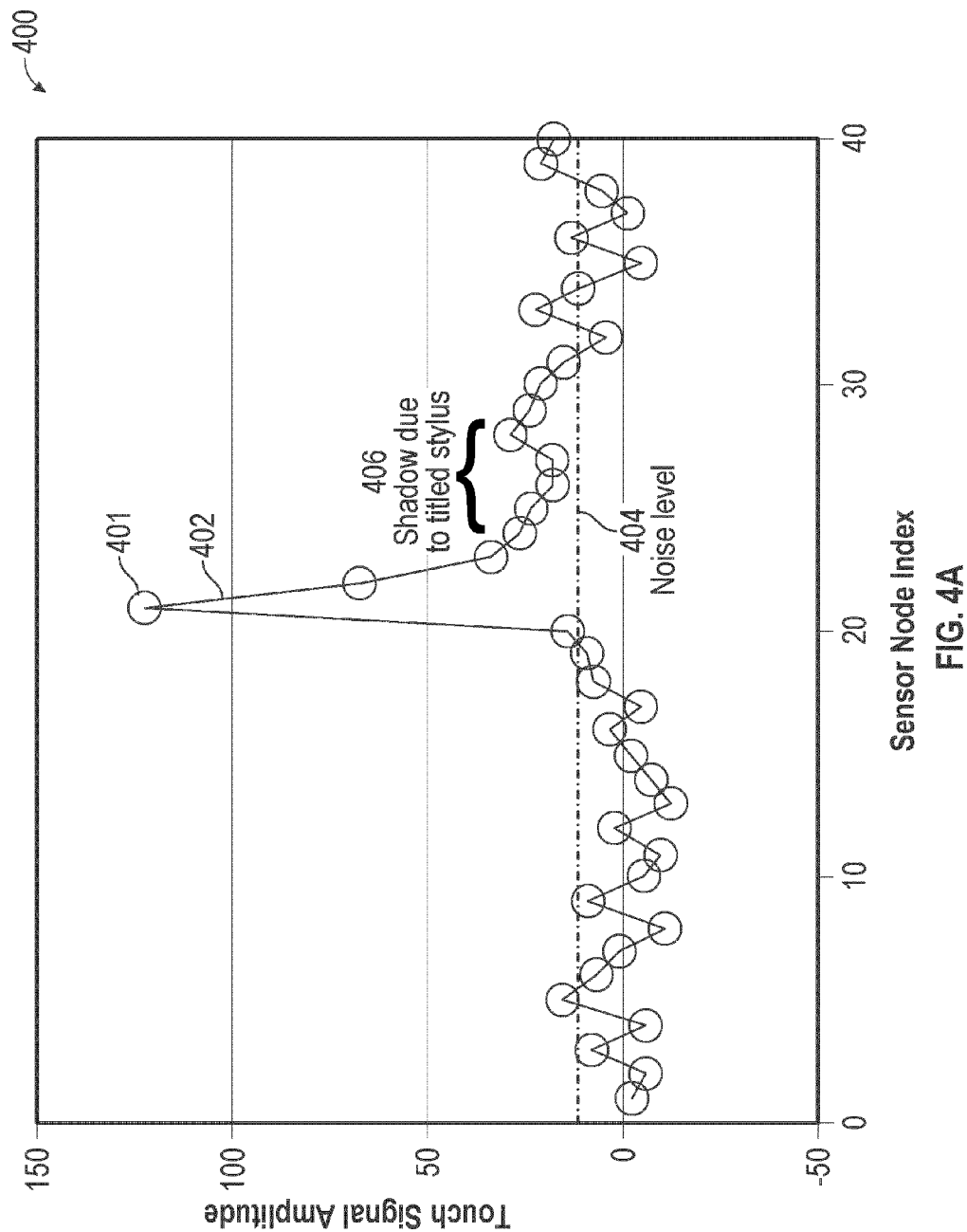

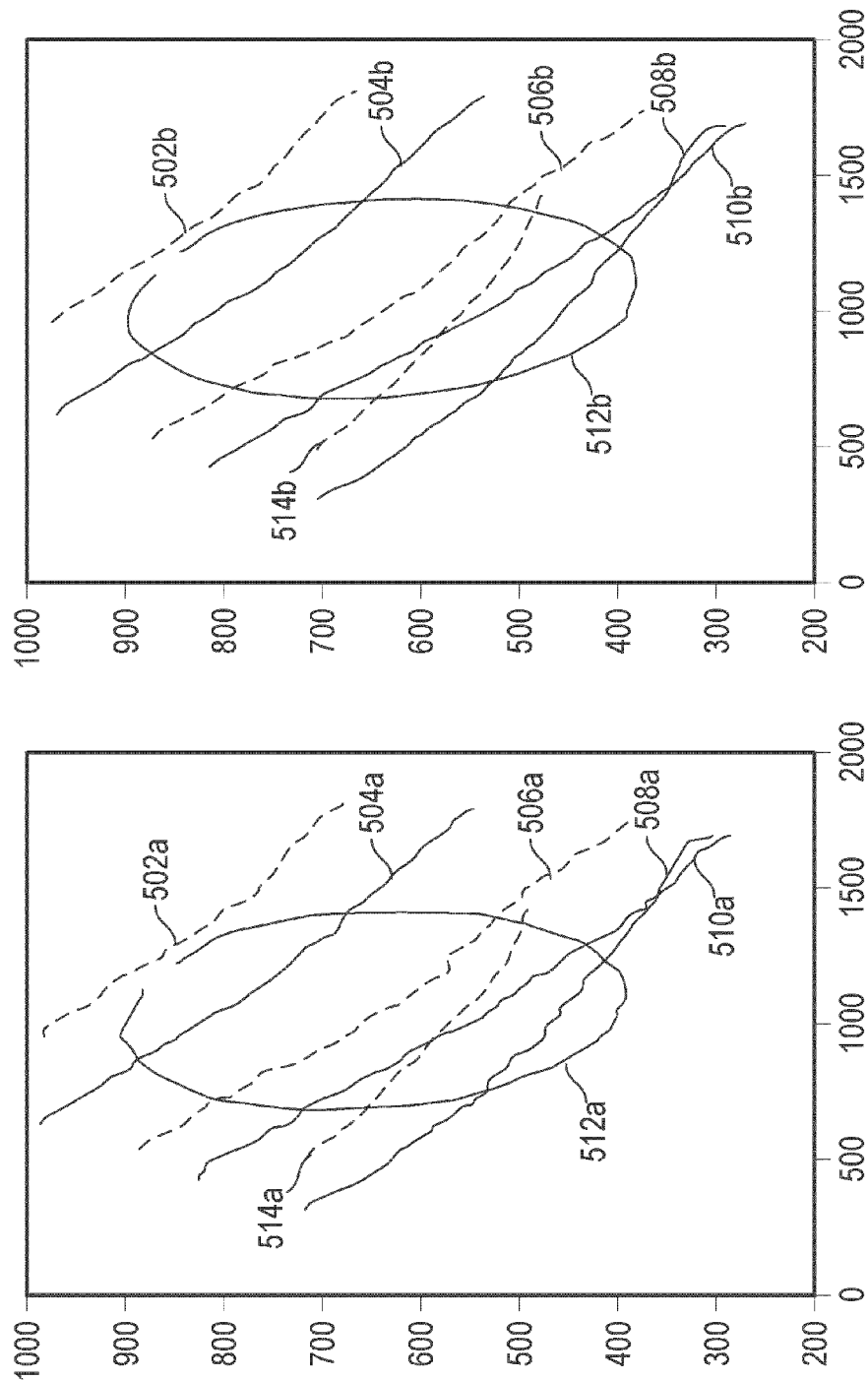

SYSTEM AND METHOD FOR REDUCING SHADOW EFFECTS IN TOUCH SYSTEMS

RELATED APPLICATIONS

This application claims the benefit of U.S. Provisional Patent Application No. 61/943,181, filed Feb. 21, 2014, titled "SYSTEM AND METHOD FOR REDUCING SHADOW EFFECTS IN TOUCH SYSTEMS," the disclosure of which is hereby incorporated herein by reference in its entirety and for all purposes.

BACKGROUND

Technical Field

The present application relates generally to touch devices, and more specifically to systems, methods, and devices for reducing shadow effects in touch systems.

Background

Advances in technology have resulted in smaller and more powerful computing devices. For example, there currently exist a variety of portable computing devices, including wireless computing devices such as wireless telephones, personal digital assistants (PDAs), and tablet computers that are small, lightweight, and easily carried by users. In order to simplify user interfaces and to avoid pushbuttons and complex menu systems, such portable computing devices may use touch screen displays that detect user gestures on the touch screen and translate the detected gestures into commands to be performed by the device. Such gestures may be performed using one or more fingers, or a stylus-type pointing implement, in contact with or in close proximity to a sensing surface of a computing device.

Due to the relatively coarse cross-section of an average human finger, finger-based touch input can be used for operating coarse controls on the user interface, such as selecting an item or pressing a button. Use cases such as on-screen drawing, calligraphy, or hand-writing capture for example, may require a fine-tipped input tool or stylus to allow the touch sensitive surface to capture finer movements. In some aspects, when a stylus is tilted, the hovering effect creates a shadow in the touch signal that makes the touch signal asymmetric. Since the stylus's signal may be weaker than a finger-based signal, the shadow may have a significant impact on stylus accuracy and make the estimated stylus trajectory unstable. Thus, systems and methods for reducing the shadow effects in touch systems are needed.

SUMMARY

Some touch screen devices detect touches by measuring the electrical signals from sensing nodes (or elements) on the touch screen. In some cases, shadows on the touch device from a tilted stylus, finger, or other touch implement may affect the electrical signals from the sensing nodes. These shadow effects mimic the characteristics of a valid touch created by at least one finger or stylus touching the touch screen, causing false touch detections and/or errors.

The systems, methods, devices, and computer program products discussed herein each have several aspects, no single one of which is solely responsible for the desirable attributes disclosed herein. Without limiting the scope of this invention as expressed by the claims which follow, some features are discussed briefly below.

Embodiments and innovations discussed herein relate to systems and methods that may be run in a processor for an electronic device to reduce the shadow effect that can affect the accurate determination of a touch position when a shadow is present. Preferably, touch accuracy correction methods have a wide range of controls and can be implemented in existing hardware or software. However, in some embodiments, specially designed hardware and software may improve speed or efficiencies of such processes.

One innovation disclosed is a method of reducing shadow effects in a touch system. The method includes the steps of receiving a touch input on a touch interface; determining a weighted mean of the touch input, the weighted mean indicating an estimated touch position of the touch input on the touch interface; determining a difference between the weighted mean of the touch input and an arithmetic mean of the touch input; and adjusting the estimated touch position of the touch input based on the difference. In some aspects, receiving a touch input comprises receiving information from a plurality of touch sensors of the touch interface and the information from each of the plurality of touch sensors represents an x position value, a y position value, and an amplitude of the estimated touch position, and adjusting comprises adjusting one or more of the x position value, the y position value, and the amplitude of the estimated touch position based on the difference. In some aspects, adjusting the estimated touch position comprises adjusting the estimated touch position to the value of a centroid when the difference is below a first threshold and to a value based on the difference when the difference is equal to or above the first threshold. In some aspects, the method further includes the steps of receiving a plurality of touch signals indicative of the touch input; identifying a maximum amplitude of the touch input of the plurality of touch signals; determining the weighted mean of the touch input based on the plurality of touch signals; and determining the arithmetic mean of the touch input. In some aspects, the touch interface is divided into a plurality of sectors by sector divisions to determine which sectors of the touch interface contain shadow effects of the touch input. In some aspects, the sector divisions pass through one of the weighted mean of the touch input and the arithmetic mean of the touch input. In some aspects, the touch interface is divided into sectors by sector divisions that pass through a sensor node of the touch interface having a maximum touch signal strength as compared to the touch signal strengths of all of the sensor nodes in the touch input. In some aspects, the method further includes the steps of sorting the plurality of touch signals in a descending order list such that the touch signal with the highest value occurs first in the list; determining a maximum value of the plurality of touch signals and adding the maximum value to an extracted touch signal; sampling the plurality of touch signals at sensor nodes adjacent to the maximum value and including the one or more neighboring signals in the extracted touch signal if an amplitude of the sampled signal is above a second threshold; and sampling the plurality touch signals at sensor nodes adjacent to the maximum value and including the one or more neighboring signals in the extracted touch signal until one of a number of sampled signals reach a third threshold, a value of the touch signal is below a fourth threshold, and a value of the touch signal is below the first threshold. In some aspects, the method further includes the steps of discontinuing sampling when a difference between a value of one of the plurality of touch signals and values of neighboring touch signals is below a fifth threshold or when the number of signals in the extracted touch signal exceeds a predetermined threshold.

Another innovation disclosed in the application is an apparatus for filtering a touch input. The apparatus includes a processor; a touch device; and a memory, operably coupled to the processor, and configured to store processor instructions that configure the processor to receive a touch input on a touch interface; determine a weighted mean of the touch input, the weighted mean indicating an estimated touch position of the touch input on the touch interface; determine a difference between the weighted mean of the touch input and an arithmetic mean of the touch input; and adjust the estimated touch position of the touch input based on the difference. In some aspects, receiving a touch input comprises receiving information from a plurality of touch sensors of the touch interface and the information from each of the plurality of touch sensors represents an x position value, a y position value, and an amplitude of the estimated touch position and the memory is further configured to store processor instructions that configure the processor to adjust one or more of the x position value, the y position value, and the amplitude of the estimated touch position based on the difference. In some aspects, adjusting the estimated touch position comprises adjusting the estimated touch position to the value of the weighted mean when the difference is below a first threshold and to a value based on the difference when the difference is equal to or above the first threshold. In some aspects, the memory further is configured to store processor instructions that configure the processor to receive a plurality of touch signals indicative of the touch input; identify a maximum amplitude of the touch input of the plurality of touch signals; determine the weighted mean of the touch input based on the plurality of touch signals; and determine the arithmetic mean of the touch input. In some aspects, the touch interface is divided into a plurality of sectors by sector divisions to determine which sectors of the touch interface contain shadow effects of the touch input. In some aspects, the sector divisions pass through one of the weighted mean of the touch input and the arithmetic mean of the touch input. In some aspects, the touch interface is divided into sectors by sector divisions that pass through a sensor node of the touch interface having a maximum touch signal strength as compared to the touch signal strengths of all of the sensor nodes in the touch input. In some aspects, the memory further is configured to store processor instructions that configure the processor to sort the plurality of touch signals in a descending order list such that the touch signal with the highest value occurs first in the list; determine a maximum value of the plurality of touch signals and adding the maximum value to an extracted touch signal; sample the plurality of touch signals at sensor nodes adjacent to the maximum value and including the one or more neighboring signals in the extracted touch signal if an amplitude of the sampled signal is above a second threshold; sample the plurality touch signals at sensor nodes adjacent to the maximum value and including the one or more neighboring signals in the extracted touch signal until one of a number of sampled signals reach a third threshold, a value of the touch signal is below a fourth threshold, and a value of the touch signal is below the first threshold; and discontinuing sampling when a difference between a value of one of the plurality of touch signals and values of neighboring touch signals is below a fifth threshold.

Yet another innovation disclosed is a system for filtering a touch input. The system includes a control module configured to receive a touch input on a touch interface; determine a weighted mean of the touch input, the weighted mean indicating an estimated touch position of the touch input on the touch interface; determine a difference between the weighted mean of the touch input and an arithmetic mean of the touch input; and adjust the estimated touch position of the touch input based on the difference. In some aspects, receiving a touch input comprises receiving information from a plurality of touch sensors of the touch interface and the information from each of the plurality of touch sensors represents an x position value, a y position value, and an amplitude of the estimated touch position. In some aspects, the control module is configured to adjust one or more of the x position value, the y position value, and the amplitude of the estimated touch position based on the difference, and wherein adjusting the estimated touch position comprises adjusting the estimated touch position to the value of the weighted mean when the difference is below a first threshold and to a value based on the difference when the difference is equal to or above the first threshold. In some aspects, the control module is further configured to receive a plurality of touch signals indicative of the touch input; identify a maximum amplitude of the touch input of the plurality of touch signals; determine the weighted mean of the touch input based on the plurality of touch signals; and determine the arithmetic mean of the touch input. In some aspects, the touch interface is divided into a plurality of sectors by sector divisions to determine which sectors of the touch interface contain shadow effects of the touch input. In some aspects, the sector divisions pass through one of the weighted mean of the touch input, the arithmetic mean of the touch input, and a sensor node of the touch interface having a maximum touch signal strength as compared to the touch signal strengths of all of the sensor nodes in the touch input. In some aspects, the control module is further configured to sort the plurality of touch signals in a descending order list such that the touch signal with the highest value occurs first in the list; determine a maximum value of the plurality of touch signals and adding the maximum value to an extracted touch signal; sample the plurality of touch signals at sensor nodes adjacent to the maximum value and including the one or more neighboring signals in the extracted touch signal if an amplitude of the sampled signal is above a second threshold; sample the plurality touch signals at sensor nodes adjacent to the maximum value and including the one or more neighboring signals in the extracted touch signal until one of a number of sampled signals reach a third threshold, a value of the touch signal is below a fourth threshold, and a value of the touch signal is below the first threshold; and discontinuing sampling when a difference between a value of one of the plurality of touch signals and values of neighboring touch signals is below a fifth threshold.

Another innovation disclosed is a non-transitory computer-readable medium storing instructions that, when executed, cause at least one physical computer processor to perform a method of reducing shadow effects in a touch system. The method includes the steps of receiving a touch input on a touch interface; determining a weighted mean of the touch input, the weighted mean indicating an estimated touch position of the touch input on the touch interface; determining a difference between the weighted mean of the touch input and an arithmetic mean of the touch input; and adjusting the estimated touch position of the touch input based on the difference. In some aspects, receiving a touch input comprises receiving information from a plurality of touch sensors of the touch interface and the information from each of the plurality of touch sensors represents an x position value, a y position value, and an amplitude of the estimated touch position. In some aspects, the method further includes the steps of adjusting one or more of the x position value, the y position value, and the amplitude of the estimated touch position based on the difference, and adjusting the estimated touch position comprises adjusting the estimated touch position to the value of the weighted mean when the difference is below a first threshold and to a value based on the difference when the difference is equal to or above the first threshold. In some aspects, the method further includes the steps of receiving a plurality of touch signals indicative of the touch input; identifying a maximum amplitude of the touch input of the plurality of touch signals; determining the weighted mean of the touch input based on the plurality of touch signals; and determining the arithmetic mean of the touch input. In some aspects, the touch interface is divided into a plurality of sectors by sector divisions to determine which sectors of the touch interface contain shadow effects of the touch input and wherein the sector divisions pass through one of the weighted mean of the touch input, the arithmetic mean of the touch input, and a sensor node of the touch interface having a maximum touch signal strength as compared to the touch signal strengths of all of the sensor nodes in the touch input. In some aspects, the method further includes the steps of sorting the plurality of touch signals in a descending order list such that the touch signal with the highest value occurs first in the list; determining a maximum value of the plurality of touch signals and adding the maximum value to an extracted touch signal; sampling the plurality of touch signals at sensor nodes adjacent to the maximum value and including the one or more neighboring signals in the extracted touch signal if an amplitude of the sampled signal is above a second threshold; sampling the plurality touch signals at sensor nodes adjacent to the maximum value and including the one or more neighboring signals in the extracted touch signal until one of a number of sampled signals reach a third threshold, a value of the touch signal is below a fourth threshold, and a value of the touch signal is below the first threshold; and discontinuing sampling when a difference between a value of one of the plurality of touch signals and values of neighboring touch signals is below a fifth threshold.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 4A is a chart showing an exemplary touch signal and illustrating potential shadow effects.

FIG. 5A is an illustration of examples of various stylus swipes across the touch node index of a touch screen.

FIG. 5B is an illustration of examples of various stylus swipes across the touch node index of a touch screen with shadow removing effects as discussed herein applied to the touch signal data.

DETAILED DESCRIPTION

Figure 1:
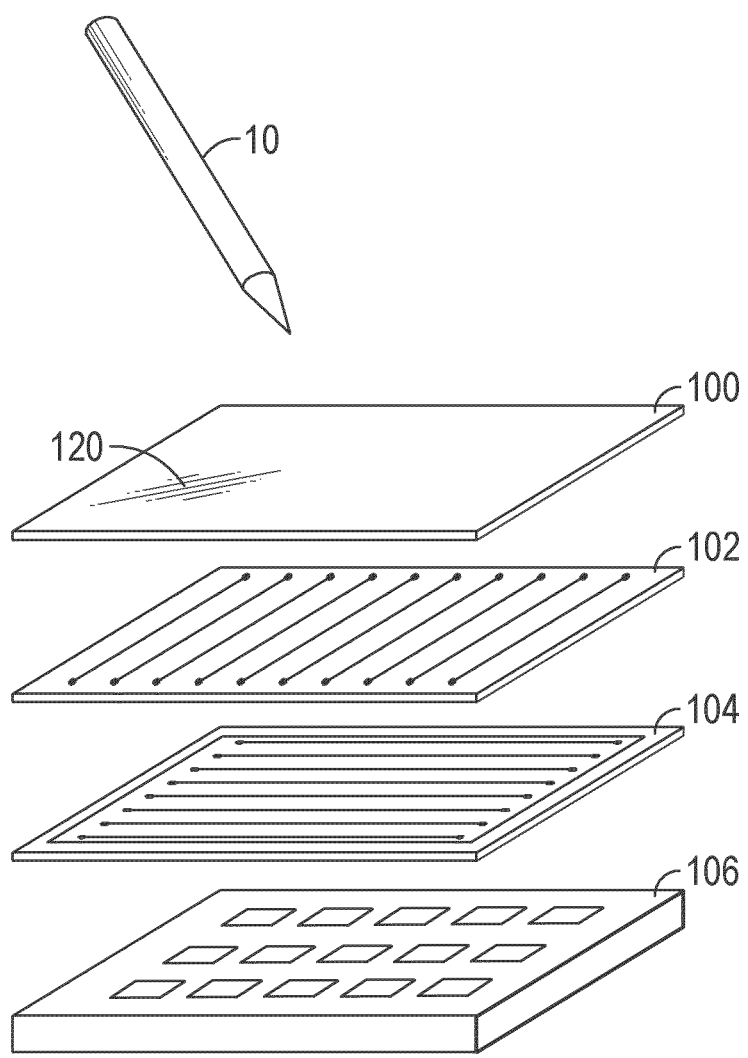
FIG. 1 is an example of the shadow produced by a stylus used with an example touch screen device.

Embodiments disclosed herein relate to touch panels that are input interfaces configured to receive a "touch input" from a user, for example, by a stylus or a user's finger(s). A touch input may also be referred to herein as a "touch event." Many touch panels used on computers and mobile devices also include a display, allowing a user to interact with displayed information. Such computers and devices include, but are not limited to, cell phones, tablet computers, cameras, appliances, gas pumps, office equipment, communication equipment, banking equipment, automobiles, grocery and retail equipment, and a variety of other consumer and commercial devices, including both wireless and non-wireless devices.

A touch panel is configured with sensor technology to sense a location of the touch input. For example, a touch panel may include a number of sensors arranged in columns and rows across the touch panel. In most if not all touch panel implementations, a touch input generates information related to a "strength" and a "location" or "touch position" of the touch input, and the generated information can be further processed as user input. The information may be, for example, one or more signals from one or more sensor nodes of the touch panel representing the location of the touch input and the strength of the touch input. The signal(s) representing the location of the touch input indicates where on the touch panel the touch input occurred, and may be generally described as an (x, y) location on the touch panel. A "touch signal" as used herein is a combination of the signal(s) from activated sensor nodes of the touch panel representing the location of the touch input. A stylus, finger, or other touch implement may produce "shadow effects" that can lead to asymmetry of the touch signal and distort the touch signal. As one having ordinary skill in the art will appreciate, the particular information generated by the touch input relating to the location and strength of the touch input may be based on the technology of a particular touch panel. Depending on the technology of a touch panel, the electronic noise and shadows (for example, caused by the touch implement) may lead to an inaccuracy in a touch input. To address such issues, embodiments described herein may process information received from a touch input to reduce or remove shadow effects and improve the accuracy of the touch input, resulting in a more accurate and more efficient input touch panel interface.

In some embodiments disclosed herein, the system can identify whether user input is being made using a human finger or a stylus. Due to the relatively large cross-section of a user's finger, finger input on a touch screen may be used for coarse operations, such as single selections or pinch or zoom gestures. Such finger-based use cases may be accomplished with low quality of service (QoS), that is, lower resolution sensing and/or scan rates. However, touch screen input via a stylus may require high QoS, (that is, higher resolution, accuracy and/or scan rates) in order to faithfully and accurately capture fine user movements, such as on-screen drawing, calligraphy, handwriting, or signature input. In particular, signature capture and verification requires high QoS in order to accurately and consistently verify a user's signature.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

FIG. 1 illustrates one possible construction of a touch panel device. This example shows the various layers that could make up the device. Top layer 100 is an overlay. It can be made of glass, plastic, or other materials. Driving layer 102 contains driving lines, which carry current. Sensing layer 104 contains sensing lines, which detect current. Notably, the driving lines of driving layer 102 and the sensing lines of sensing layer 104 intersect each other to form a grid. Optional display layer 106 produces the image seen on the touch panel.

Having a driving layer 102 and sensing layer 104 as separate layers is an embodiment of mutual capacitance technology. However, a person having ordinary skill in the art would recognize that there are many other known ways for a touch screen device to be constructed, including combining one or more of the aforementioned layers in FIG. 1 into a single layer. The embodiments of this invention are not limited to any particular way of constructing the touch panel device.

FIG. 1 also illustrates a shadow effect on a touch panel from a stylus 10. A shadow 120 from the stylus 10 may be formed on the top layer 100 of the touch screen device. As will be discussed in greater detail below, a shadow, for example, the shadow 120 produced by the stylus 10, may reduce the accuracy of the touch signal position determination.

Figure 2:
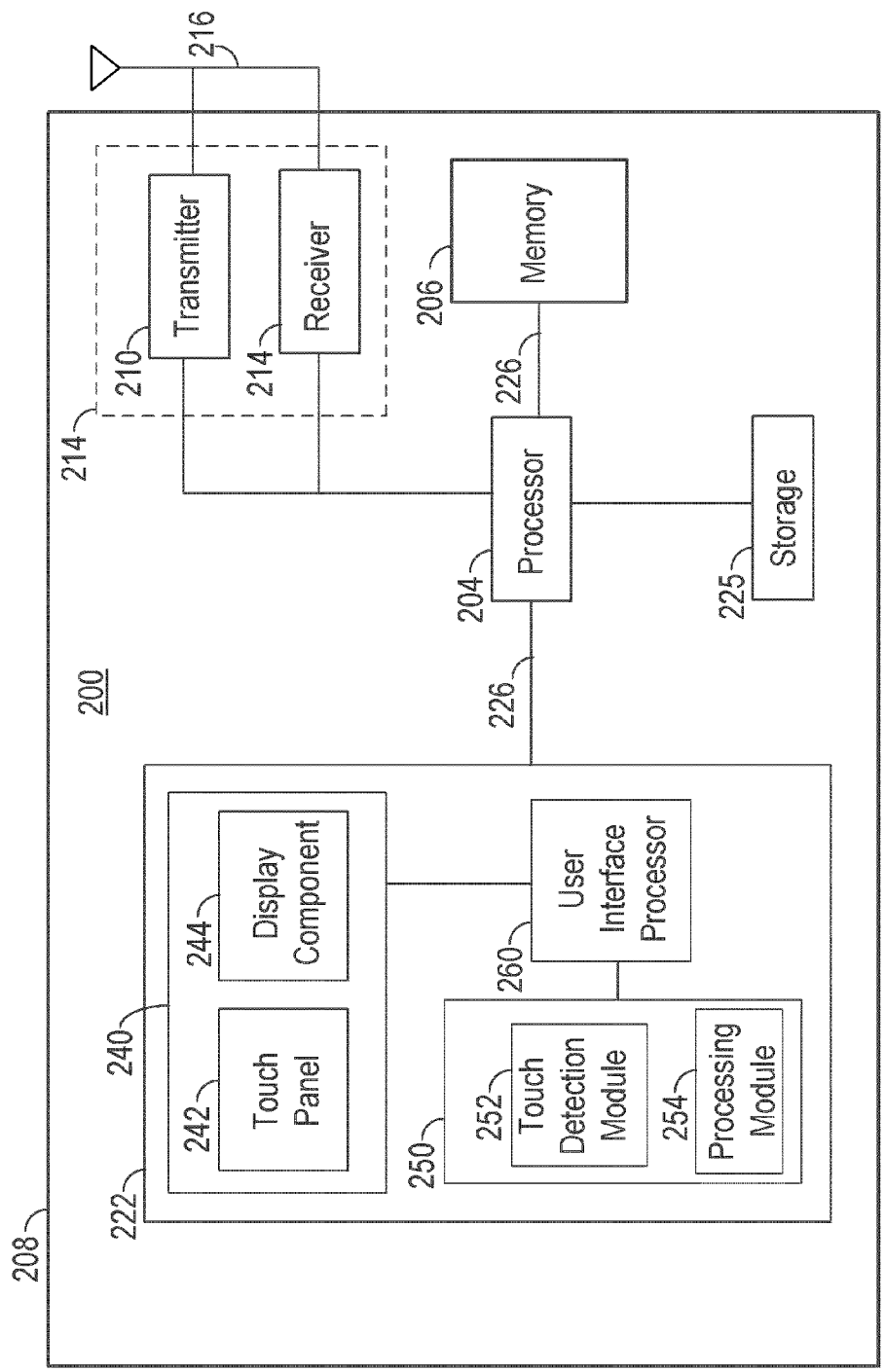
FIG. 2 is a block diagram illustrating an example of a mobile computing device that includes a touch panel and that may be configured to implement various embodiments described herein.

FIG. 2 illustrates an example of a device 200 that includes a touch panel and that may be configured to implement various embodiments described herein. Device 200 is illustrated as being a wireless device, however, other embodiments include a variety of wired and wired devices, mobile and non-mobile devices, consumer and commercial devices, for example, as described hereinabove.

As shown in the embodiment illustrated in FIG. 2, device 200 includes a processor 204 which is configured to control operations of the device 200. The processor 204 may also be referred to as a central processing unit (CPU). The device 200 also includes a memory component 206 which is in communication with the processor 204 via a bus system 226. Memory component 206 may include both read-only memory (ROM) and random access memory (RAM), and may store instructions and data that can be accessed and used by the processor 204. A portion of the memory component 206 may also include non-volatile random access memory (NVRAM). The processor 204 is configured to perform operations (for example, logical and arithmetic operations) based on program instructions that are stored in the memory component 206. The instructions in the memory component 206 may be executable to implement the methods described herein. The device 200 may also include another storage component 225 that is in communication with the processor 204, and that is configured to store information that can be accessed by the processor 204, and/or instructions for controlling the operation of the processor 204 or any other component of device 200. Although not explicitly shown, the device 200 may be configured such that another processor of device 204 (for example, user interface processor 260) may also be in communication with the storage component 225.

The processor 204 is representative of a processing system that may include one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

Such a processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

FIG. 2 further illustrates that the device 200 embodiment may also include a housing 208, which can be, for example, a mobile device housing, a housing of an appliance, or office equipment. In some embodiments, the components described in reference to FIG. 2 as being in housing 208 may be instead disposed within a piece of equipment (for example a copier) that has a housing that generally contains illustrated components and man additional components. In this embodiment, the device 200 further includes a transmitter 210 and/or a receiver 212 which are disposed in the housing 208. The transmitter 210 and receiver 212 are configured to transmit and receive data, communicating data between the device 200 and another device. The transmitter 210 and receiver 212 may be combined into a transceiver 214. The device 200 may also include an antenna 216 that may be electrically coupled to the transceiver 214. Various embodiments of the device 200 may also include multiple transmitters, multiple receivers, multiple transceivers, and/or multiple antennas (not shown).

The transmitter 210 may be configured to wirelessly transmit packets having different packet types or functions. For example, the transmitter 210 may be configured to transmit packets of different types generated by the processor 204. When the device 200 is implemented or used as an access point or station, the processor 204 may be configured to process packets of a plurality of different packet types. For example, the processor 204 may be configured to determine the type of packet and to process the packet and/or fields of the packet accordingly. The receiver 212 may be configured to wirelessly receive packets having different packet types. In some aspects, the receiver 212 may be configured to detect a type of a packet used and to process the packet accordingly.

The device 200 may also include a signal detector 218 that may be used in an effort to detect and quantify the level of signals received by the transceiver 214. The signal detector 218 may detect such signals as total energy, energy per subcarrier per symbol, power spectral density and other signals.

The device 200 may further comprise a user interface 222 that includes a touch panel 242. The user interface 222 may include any element or component that conveys information to a user of the device 200 and/or receives input from the user. Systems and methods for improving the accuracy of touch position estimates by mitigating shadow effects can be implemented in device 200.

As illustrated in the embodiment of FIG. 2, various components of the device 200 may be coupled together by and communicate using the bus system 226 The bus system 226 may include a data bus, for example, as well as a power bus, a control signal bus, and a status signal bus in addition to the data bus. The components of the device 200 may also be coupled together or provide information or data to each other using some other mechanism.

Although a number of separate components are illustrated in FIG. 2, one or more of the components may be combined or commonly implemented. Further, each of the components illustrated in FIG. 2 may be implemented using a plurality of separate elements. As illustrated in the embodiment of FIG. 2, the user interface 222 may include a display 240 and a touch screen subsystem 250. The user interface 222 may also include a user interface processor 260 to perform operations associated with the user interface. In some embodiments, processor 204 (or another processing component in the device 200) may perform operations to control the display of data on the display component 240 and to receive touch inputs from the user interface 222. The illustrated embodiment is not meant to be limiting and device 200 may include a variety of other components as required for other functions.

The display 240 of the user interface 222 may include a touch panel 242. The touch panel 242 may be incorporated in a display 240. In various embodiments, the display 240 may include, for example, LED, LCD of plasma technology to display information. The display 240 also may include a display component 244, which may be, in some embodiments, coupled to a user interface processor 260 or processor 204 for receiving information (for example, images, text, symbols or video) to display visually to a user.

The touch panel 242 may have implemented therein one or a combination of touch sensing technologies, for example, capacitive, resistive, surface acoustic wave, or optical touch sensing. In some embodiments, touch panel 242 may be positioned over (or overlay) display component 244 in a configuration such that visibility of the display component 244 is not impaired. In other embodiments, the touch panel 242 and display component 244 may be integrated into a single panel or surface. The touch panel 242 may be configured to operate with display component 244 such that a touch input on the touch panel 242 is associated with a portion of the content displayed on display component 244 corresponding to the location of the touch on touch panel 242. Display component may also be configured to respond to a touch input on the touch panel 242 by displaying, for a limited time, a visual representation of the touch.

Still referring to the embodiment of FIG. 2, touch panel 242 is coupled to a touch screen subsystem 250 that includes a touch detection module 252 and a processing module 254. The touch panel 242 may operate with touch screen subsystem 250 to sense the location, pressure, direction and/or shape of a user touch or touches on display 240. The touch detection module 252 may include instructions that when executed scan the area of the touch panel 242 for touch events and provide the coordinates of touch events to the processing module 254.

The processing module 254 may be configured to analyze touch events, including adjusting the touch signal to mitigate shadow effects as described in further detail below to improve the accuracy of the touch position, and to communicate touch data to user interface processor 260. The processing module 254 may, in some embodiments, include instructions that when executed act as a touch screen controller (TSC). The specific type of TSC implemented can depend on the type of touch technology used in touch panel 242. The processing module 254 may be configured to start up when the touch detection module 252 indicates that a touch input has occurred on touch panel 242, and to power down after release of the touch. This feature may be useful for power conservation in battery-powered devices.

The processing module 254 may also be configured to perform shadow reduction processing on stylus touch events, as discussed herein. The processing module 254 may, in some embodiments, include instructions that when executed cause the processing module 254 to determine a metric to measure the touch signal spike asymmetry and then use that metric to mitigate the shadowing effect. In some embodiments, the processing module 254 may include instructions that when executed cause the processing module 254 to compare the centroid, or weighted mean, of a touch event with an arithmetic mean of the touch event to determine the metric. As discussed above, the processing module 254 may further include instructions that when executed cause the processing module 254 to adjust the estimated centroid of the touch even using the calculated metric.

Processing module 254 may be configured to perform filtering on touch input information received from the touch detection module 252. For example, in an embodiment of the display 240 where the touch panel 242 is disposed on top of a display component 244 that includes a LCD screen, the LCD screen may contribute noise to the coordinate position measurement of the touch input. This noise may be a combination of impulse noise and Gaussian noise. The processing module 254 may be configured with median and averaging filters to reduce this noise. Instead of using only a single sample for a coordinate measurement of the touch input, the processing module 254 may be programmed to instruct the touch detection module 252 to provide more than one sample (e.g., two, four, eight, or 16 samples). These samples may then be sorted, median filtered, and averaged to give a lower noise, more accurate result of the touch coordinates.

In some embodiments, the processing module 254 can be a processor specifically configured for use with the touch screen subsystem 250, while user interface processor 260 may be configured to handle the general processing requirements of the user interface. The processing module 254 and the user interface processor 260 may be in communication with each other. In various embodiments, the processing described as being performed by user interface processor 260, processing module 254, and processor 204 may performed in different processors or a single processor.

Figure 3:
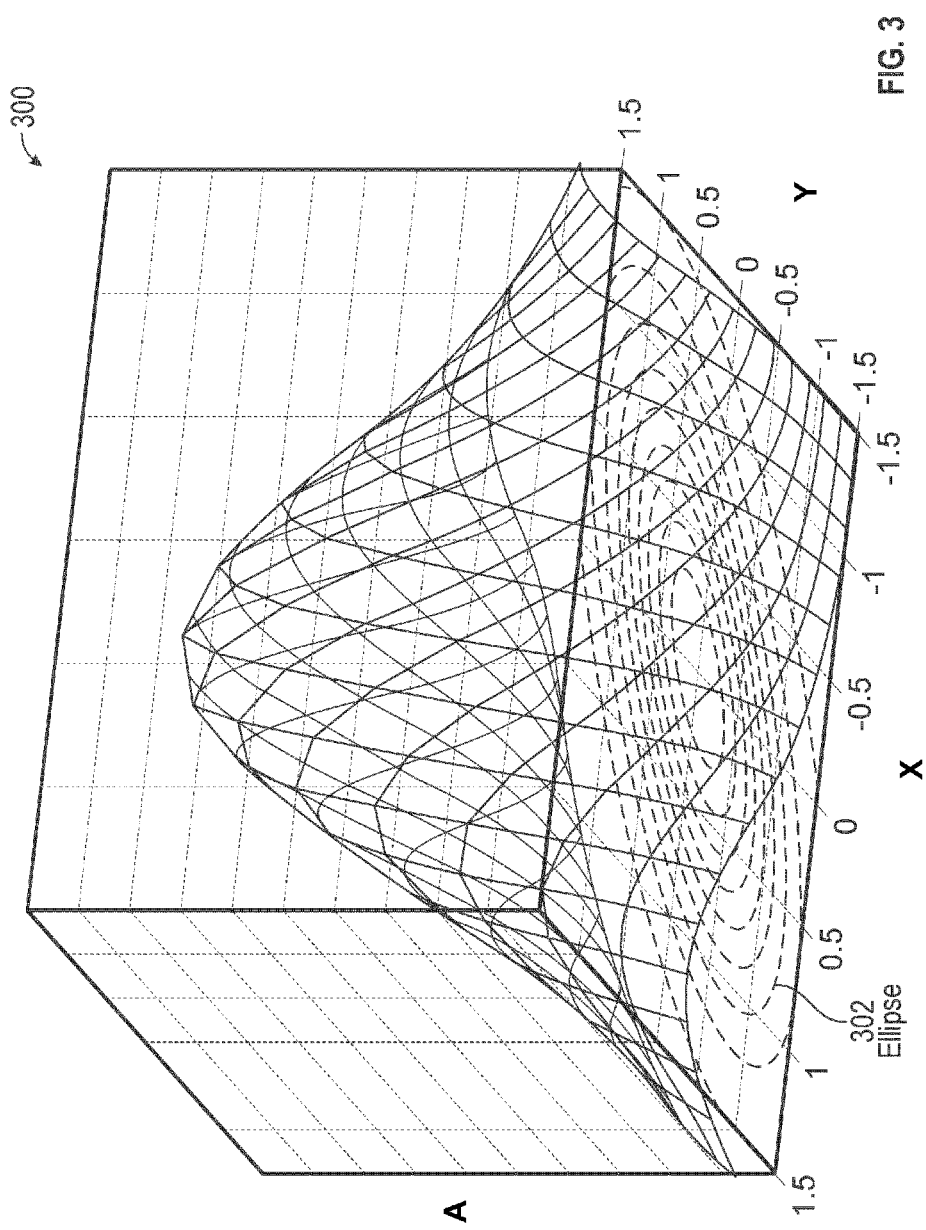
FIG. 3 is a three-dimensional chart of an exemplary elliptical touch signal.

FIG. 3 is a three dimensional chart 300 of an exemplary elliptical touch signal 302. A sensed signal can be visualized in three dimensions. The first two dimensions, x and y, reflect the location of the signal on the touch panel. The units of these axes indicate sensing nodes, pixels, or any metric of screen location (e.g., millimeters). The third dimension, A, represents the amplitude of an electrical signal (e.g., a current or voltage) measured by a sensing circuit at each sensing node. This measurement is dependent on the current flow on the circuit to which the sensing node is connected, which in turn is dependent on the capacitance due to, for example, a finger touch, stylus touch, shadow effect, or electrical noise. The amplitude of the signal at any point may be referred to as the signal value at that location. A sensed signal also changes over time.

A touch signal may be called elliptically symmetric if the activated sensor nodes on the same ellipsis (defined below) have the same amplitude. An ellipse may be defined by the following formula:

$$a(x-x_0)^2 + 2b(x-x_0)(y-y_0) + c(y-y_0)^2 = \delta_i \qquad \text{Eqn. 1}$$

Where $x_0$ is the x-coordinate center of the ellipse and $y_0$ is the y-coordinate center of the ellipse, a, b, and c are variables and $\delta_i$ is the value of the ellipse.

An elliptically symmetric touch signal's centroid (a.k.a. weighted mean) may be the same as its arithmetic mean provided the signal has enough samples. An equation to determine the x and y coordinates of the centroid is shown below as Equation 2. An equation to determine the x and y coordinates of the arithmetic mean is shown below as Equation 3.

Centroid $\qquad$ Eqn. 2

$$c_x = \frac{\sum_x w_x x}{\sum_x w_x}$$

$$c_y = \frac{\sum_y w_y y}{\sum_y w_y}$$

Arithmetic Mean $\qquad$ Eqn. 3

$$m_x = \frac{\sum_x x}{N}$$

$$m_y = \frac{\sum_y y}{N}$$

Where w is a signal value which will constitute the weighting factor applied to the signal at touch sensor node locations such that a higher weight is applied to the signals at the touch sensor nodes having a higher value and x and y are the positional coordinates of the sensed touch signal. The arithmetic mean is the sum of the x and y positions divided by the number of samples, N. As is discussed in greater detail below, the arithmetic mean may be used to correct for shadow effects by determining a difference between the weighted mean and the arithmetic mean and using this difference to adjust the estimated touch position of the touch input.

FIG. 4A is a chart 400 illustrating a touch signal 402 acquired from a stylus contacting a touch screen. The x-axis of the chart 400 represents sensor nodes or sensor elements along a certain linear portion of a touchscreen, for example, touch sensors along a line on the touch panel. The y-axis of the chart 400 represents a signal strength as measured by the sensors. Accordingly, the touch signal 402 represents a strength of a touch signal as indicated by the signal strengths of a plurality of sensor nodes along a certain line (for example, oriented horizontally, vertically, or at an angle to sensor node lines and sensor node columns of the touch screen). The touch from a finger or stylus may cover several sensor nodes along a line on the touch screen depending, for example, on the width of the finger or stylus. The touch signal 402 may, therefore, represent a line of sensor nodes that are affected by the touch input.

FIG. 4A further illustrates shadow effects due to a tilted stylus. Signal strengths at the sensor nodes within the region 406 of the touch signal 402 immediately following or to the right of the maximum amplitude 401 of the touch signal 402 are higher than those immediately preceding or to the left of the maximum amplitude 401 of the touch signal 402. When a stylus is tilted, the hovering effect creates a shadow effect in the touch signal 402 that makes the touch signal asymmetric, as illustrated by the sensor node signals in the region 406. The shadow effect of a stylus or hand gesture is generally below the stylus or hand and usually on one side of the highest amplitude of the touch signal, depending on the tilt angle of the stylus. As illustrated in FIG. 4A, the shadow effect illustrated by the sensor node signals in the region 406 is to the right of the maximum amplitude 401 of the touch signal 402. The shadow effect from a stylus or a hand gesture, as illustrated by the sensor node signals in the region 406, may occupy more than one sector of a touch panel, each sector of the touch panel containing a number of sensor nodes. For a 2D signal, a processor may include instructions to scan through all of the sensor nodes of a touch panel in some pattern. Data from all of the sensor nodes may be captured in a frame. A complete touch signal may be extracted or detected within the frame by the following process: starting with the touch signal having the highest amplitude (such as node signal 401) and continue to include neighboring node signals that are above the noise level 404 (as shown in FIG. 4A) and discontinue including node signals when the touch signal amplitude drops below the noise level 404. The asymmetry of the complete touch signal may then be measured. If there is no hover, or shadow effect, then the touch signal is generally elliptically symmetric, as discussed in greater detail above. The shadow effect illustrated by region 406 shown in FIG. 4A may have significant impact on stylus accuracy as illustrated in FIG. 5A described more fully below.

According to one exemplary embodiment, reduction of the shadow effect may utilize a metric to measure the touch signal asymmetry and then use that metric to mitigate the shadow effect.

If a touch signal is not elliptically symmetric, there may be a difference between the centroid and the arithmetic mean of the touch signal. In some embodiments, the difference between the centroid and arithmetic mean may be used to characterize the asymmetry of a touch signal, as shown by Equation 4 below.

$A$=ArithmeticMean−Centroid $\qquad$ Eqn. 4

Where A is the estimated asymmetry.

With the above asymmetry metric, A, Equation 5 may be used to adjust the estimated centroid to mitigate the shadow effect.

Estimatted_Touch_Position = $\qquad$ Eqn. 5

$$\begin{cases} \text{Centroid} & \text{if } A \text{ is below certain threshold} \\ \text{Centroid} - F * A & \text{Otherwise} \end{cases}$$

Where F is an adjustment factor that may be determined heuristically or may be predefined. Other formulas may be used to adjust the touch position based on the value of A. In some embodiments, the adjustment to the touch position may comprise a non-decreasing function of A, the larger the value of A, the larger the adjustment.

In some embodiments, the shadow effect shown as the sensor node signals in the region 406 of FIG. 4A may be mitigated by performing analysis of the touch signal. An initial estimate of the amplitude 401 and width of the touch signal 402 may be determined from the size of the touch stylus or other pointing object. Further analysis may be performed on the touch signal 402 to determine where to cut off the touch signal at a threshold number of sensor nodes. Additionally, to determine which sensor node signal values to exclude from the touch signal, a lowest acceptable touch signal value or noise value, such as noise level 404, may be set. Values above this threshold may be included in the touch signal. This threshold value may be predetermined or may be determined adaptively at run time. In some embodiments, an extracted touch signal may be extracted by the following process. First, the values of touch signals at the sensor nodes are sorted in descending order starting with the touch signal value having the highest amplitude value, such as touch signal value 401. Initially, the highest amplitude value 401 is included with the extracted touch signal. The values of signals at nodes that neighbor the node with the highest touch signal amplitude and that have an amplitude above a threshold, such as noise level threshold 404, are included with the extracted touch signal. Signals at nodes satisfying this criteria are continuously added to the extracted touch signal until either the value of the extracted touch signal at a node drops below the predetermined amplitude or noise threshold 404, the number of values/nodes in the extracted touch signal has reached a predetermined threshold amount, the extracted touch signal has a flat region as described below, or the extracted touch signal's asymmetry exceeds a threshold as described below.

Figure 4B:
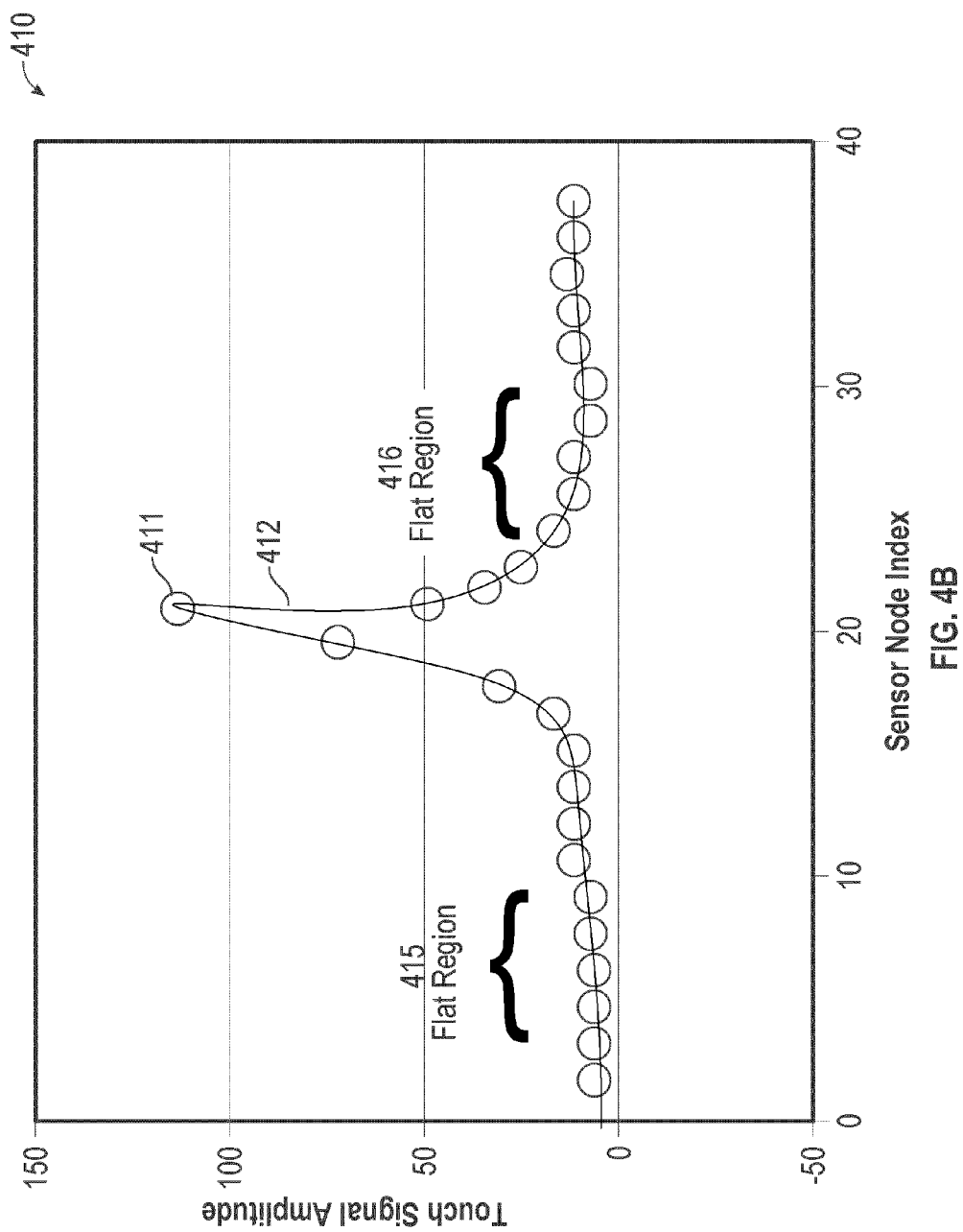
FIG. 4B is a chart showing an exemplary touch signal and illustrating a flat region of the touch signal.

In other embodiments, a touch signal shape analysis may be performed during the signal extraction process described above to find the "flat" region that should not be included in the extracted touch signal. FIG. 4B is a chart 410 illustrating a touch signal 412 acquired from a stylus contacting a touch screen. The x-axis of the chart 410 represents sensor nodes or sensor elements along a certain linear portion of a touchscreen, for example, touch sensors along a line on the touch panel. The y-axis of the chart 410 represents a signal strength as measured by the sensors. Accordingly, the touch signal 412 represents a strength of a touch signal as indicated by the signal strengths of a plurality of sensor nodes along a certain line (for example, oriented horizontally, vertically, or at an angle to sensor node lines and sensor node columns of the touch screen). The touch from a finger or stylus may cover several sensor nodes along a line on the touch screen depending, for example, on the width of the finger or stylus. The touch signal 412 may, therefore, represent a line of sensor nodes that are affected by the touch input. The flatness of a touch signal, such as touch signal 412, at a touch sensor node can be characterized by the difference between the value of the touch signal at the node and the values of touch signals at neighboring nodes of the extracted touch signal. If the neighboring nodes to the node under analysis are already included in the extracted touch signal, there are different ways to determine which difference will be used to determine a flatness of the extracted touch signal and therefore whether to exclude further nodes from the extracted touch signal. Flat regions of the touch signal, such as flat regions 415, 416, may extend to the left and/or to the right of the maximum amplitude 411. Note that in the signal extraction process described above, nodes are included in the extracted touch signal according to the order of descending values, that is, a node with higher value is included earlier than a node with lower value. If the difference between the node being analyzed and a neighboring node is below a threshold that may either be predetermined or determined adaptively during run time, then the node is considered in a flat region of the extracted touch signal, such as flat regions 415 and 416 of the touch signal 412 shown in FIG. 4B, and should be excluded from the extracted touch signal. At this point, the touch signal extraction process stops. In some embodiments, the threshold could be specified as a value, a percentage of the highest value in the touch signal, or minimum of the value and the percentage of the highest value in the touch signal.

Figure 4C:
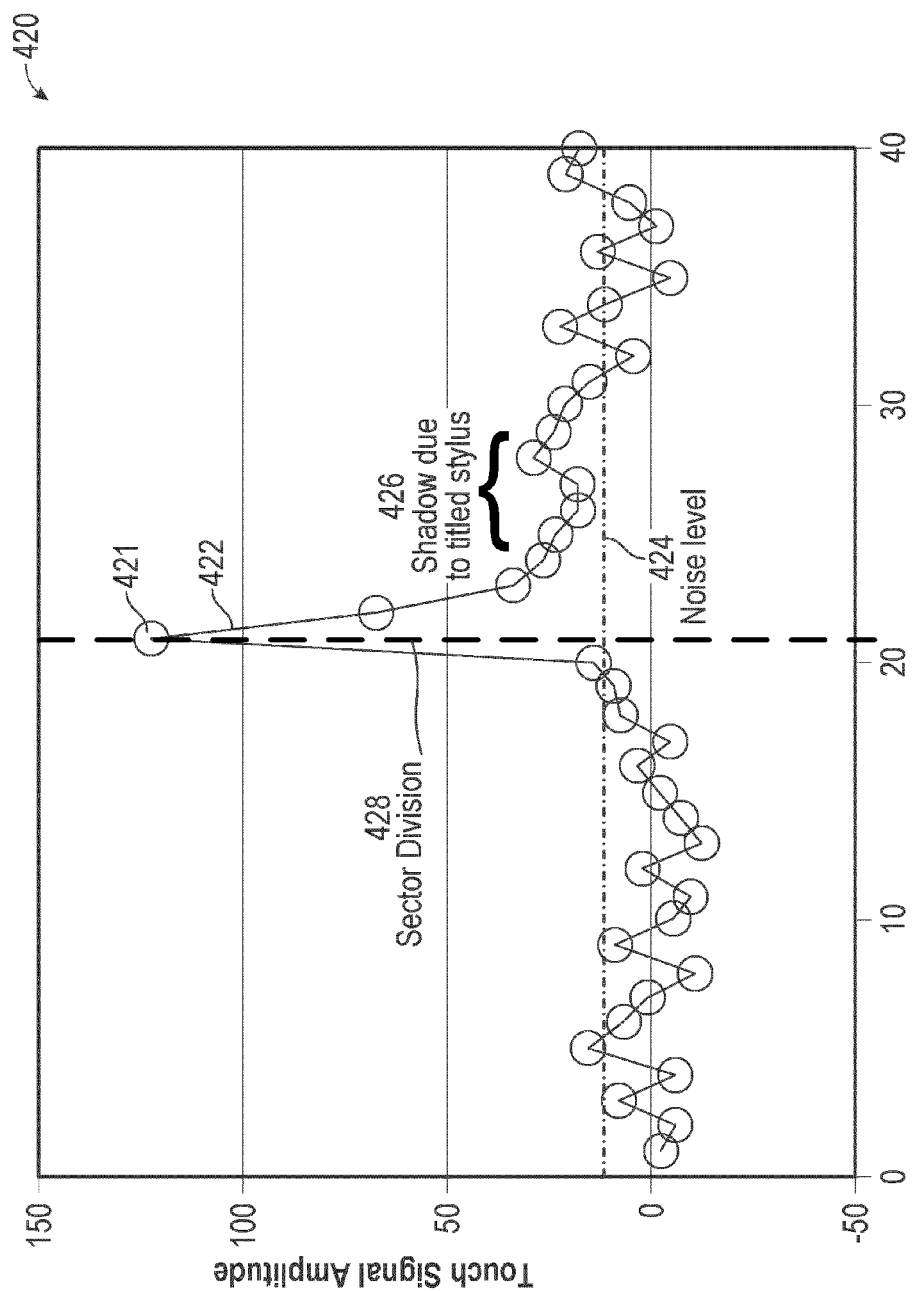
FIG. 4C is a chart showing an exemplary touch signal and illustrating a sector division of the touch panel based on aspects of the touch signal.

In other embodiments, a touch signal asymmetry analysis may be performed during the signal extraction process described above. FIG. 4C is a chart 420 illustrating another touch signal 422 acquired from a stylus contacting a touch screen. As illustrated in FIG. 4C, the shadow effect illustrated by the sensor node signals in the region 426 is to the right of the maximum amplitude 421 of the touch signal 422. As discussed above, sensor node values in the shadow effect region 426 may be above a noise level 424. The shadow effect from a stylus or a hand gesture, as illustrated by the sensor node signals in the region 426, may occupy more than one sector of a touch panel, each sector of the touch panel containing a number of sensor nodes. The 2D representation of the touch signal 422 is divided into sectors of the touch panel or interface. In some embodiments, the sector divisions may pass through the node with the highest signal strength, such as sector division 428 that passes through the node 421. In some embodiments, the sectors may be determined based on the location of the centroid of the touch signal. For example, sector divisions may pass through the determined centroid of the touch signal. In yet another example, the sector divisions may pass through the arithmetic mean of the touch signal, calculated as discussed above. After a touch signal at a node is included in the extracted touch signal during the signal extraction process, the number of activated nodes in each sector is updated. Next, the number of activated nodes in each sector is compared. The difference between the number of activated touch nodes in different sectors of the touch panel or interface may be used to characterize the touch signal asymmetry. When the difference is above a threshold, the touch signal extraction process stops. When the sector division of the touch panel is based on the centroid or arithmetic mean of the touch signal, the touch signal extraction consists of two passes. During the first pass, the signal extraction process is run without the asymmetry analysis. Next, the centroid or arithmetic mean of the touch signal extracted by the first pass is calculated and the sector division is made. Finally, during a second pass, the signal extraction process is run with the asymmetry analysis.

In other embodiments, a method of reducing shadow effects (or stylus bias) may include cutting off a touch signal peak. In some embodiments, a touch signal may be extracted as follows. Starting with the peak value of the touch signal, touch signal values above a predetermined noise level at neighboring nodes are included in the extracted touch signal. With reference again to FIG. 4A, the analysis of the touch signal 402 begins at the peak value 401 and proceeds to neighboring nodes. Touch signal values at nodes should not be included in the extracted touch signal containing the peak value 401 when the touch signal value drops below the noise level, such as noise level 404, when the number of values/nodes/signals in the touch signal has reached a threshold value, when the rate of change of the touch signal size (that is, the number of signals in the extracted touch signal) exceeds a predetermined threshold, or when the touch signal's asymmetry exceeds a predetermined threshold, with the asymmetry illustrated by the shadow effect region 406. This method may be combined with the above formulas for estimating touch position to reduce shadowing. In some aspects, the combined methods may improve linearity, touch accuracy, scan rates and reduce instability.

FIGS. 5A and 5B illustrate examples of two touch inputs that may be made with a stylus, finger, or other touch implement. FIG. 5A illustrates various touch inputs 502a, 504a, 506a, 508a, 510a, and 514a across the touch sensor node index of a touch panel. The touch inputs 502a, 504a, 506a, 508a, 510a, and 514a have not had any of the above methods for reducing shadow effects applied. FIG. 5B is an illustration of various touch inputs 502b, 504b, 506b, 508b, 510b, and 514b wherein the touch position has been adjusted and shadow effects have been reduced. As shown, and as compared to the touch inputs shown in FIG. 5A, the touch inputs of FIG. 5B demonstrate reduced instability and non-linearity, leading to improved estimated touch positions and accuracy (as a result of the reduced shadow effects). In some embodiments, adjustment of the touch position can be performed as the line is drawn. In other embodiments, the adjustment of the touch position may be performed after the line is drawn.

Figure 6:
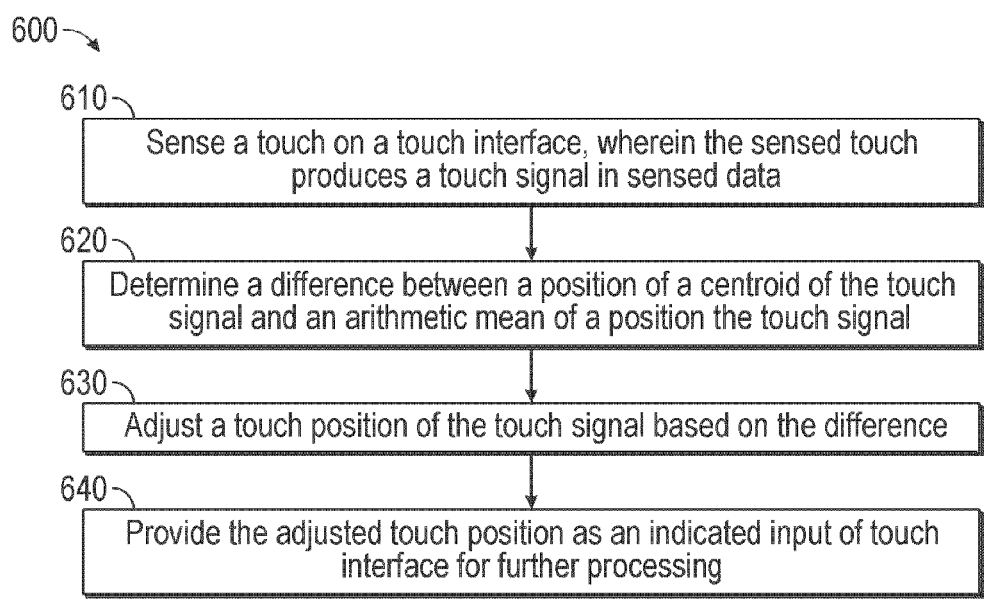
FIG. 6 is a flowchart for reducing shadowing effects of a touch position.

FIG. 6 is a flowchart for reducing shadow effects of a touch signal and improving the estimated touch position of a touch input on a touch panel. In some aspects, process 600 may be performed by the device 200. In some other embodiments, the process 600 may be performed on any device having a touch screen or panel, such as a copier or automated teller machine. In some embodiments, process 600 may be performed by the processor 204 or the user interface processor 260 of the device 200.

In block 610, a touch input is sensed or received on a touch interface, such as touch panel 242. The sensed touch produces a touch signal having an amplitude spike. In some aspects, the touch input may include amplitude values received from a plurality of touch sensors. For example, amplitude values for touch sensors or nodes within a proximity of a touch spike, such as the maximum of the touch data 402 may be received. In some aspects, at least a portion of the received touch input may correspond to input related to a finger or other object touching or coming within a proximity of a sensor of a touch panel 242. The touch input may generate information from a plurality of touch sensors, with the information from each touch sensor including x and y coordinate values, and an amplitude value.

In block 620, a difference between a position of a centroid of a touch signal and an arithmetic mean of a position the touch signal is determined. In some embodiments, the centroid may be determined in some aspects via a weighted average of the input values received in block 610. For example, the x values for each of the plurality of touch sensor data points included in the touch input of block 610 may be weighted based on the data point's amplitude value. A weighted average of the x values may then be used to determine the centroid position. A similar calculation may be performed with respect to the y values of the touch sensor data points.

In block 630, a touch position of the touch signal is adjusted based on the difference determined in block 620. In block 640, the adjusted touch position is provided as an indicated input of the touch interface for further processing. The adjusted touch position calculated using the method outlined in FIG. 6 can reduce the shadow effects caused by a stylus or finger that may reduce the accuracy of the touch event. In block 640, the adjusted touch position is provided as an indicated input of a touch on the touch panel for further processing.

Figure 7:
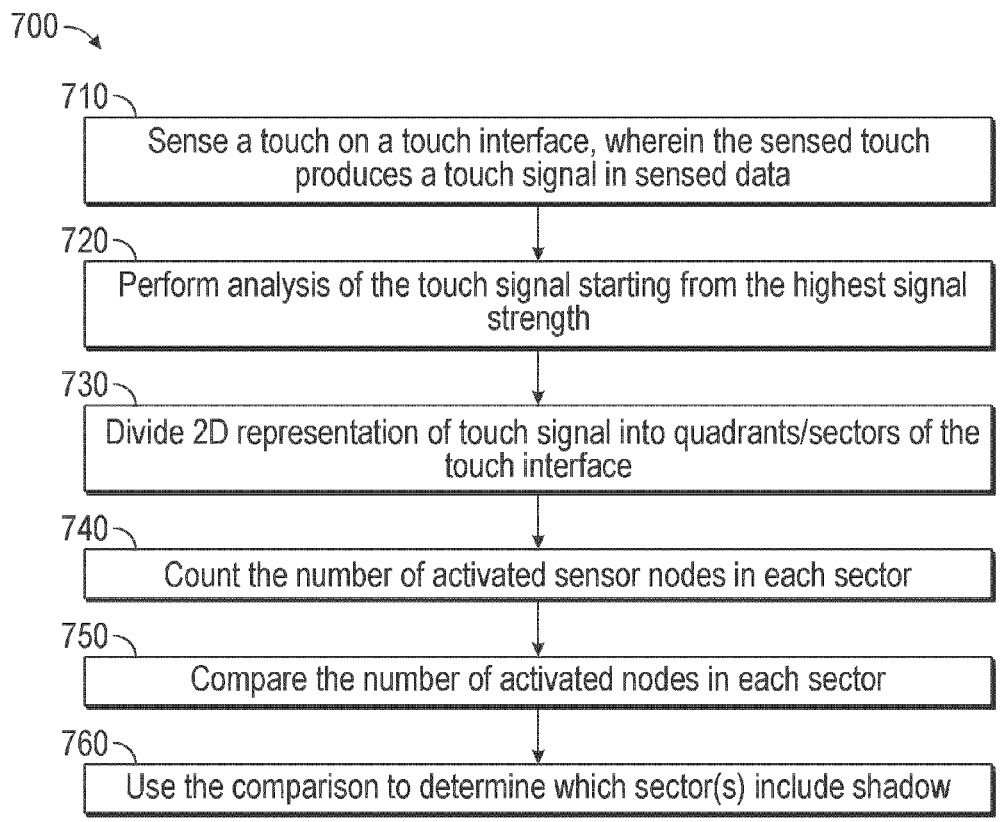
FIG. 7 is a flowchart of a method of determining a shadow effect of a touch position.

FIG. 7 is a flowchart for determining which sectors of a touch panel include shadow effects of a touch signal affecting the touch position. In some aspects, process 700 may be performed by the device 200. In some other embodiments, the process 700 may be performed on any device having a touch screen, such as a copier or an automated teller machine. In some embodiments, process 700 may be performed by the processor 204 or the user interface processor 260 of the device 200.

In block 710, a touch signal is sensed on a touch interface or panel. The sensed touch produces a touch signal having an amplitude spike. Next, in block 720, analysis of the touch signal is performed starting from the highest signal strength or peak. In block 730, the 2D representation of the touch signal is divided into sectors based on the sectors of the touch panel or interface. In some embodiments, the sectors may be determined based on the location of the centroid of the touch position. For example, sector divisions may pass through the determined centroid of the touch position. In another example, the sector divisions may pass through the node with the highest signal strength. In yet another example, the sector divisions may pass through the arithmetic mean of the touch signal, calculated as discussed above.

In block 740, the number of activated nodes in each sector is determined. Next, in block 750, the number of activated nodes in each sector is compared as discussed above. Finally, in block 760, the comparison of activated sensor nodes is used to determine which sector(s) include shadow effects. This determination may be used to determine if the touch position should be adjusted to correct for the shadow effects, as described in FIG. 6, for example. In general, touch signals at different locations on the touch interface have different shadows, as the touch sensitivity is position dependent based on how close the actual touch is to a sensor node. Additionally, the angle of the stylus can affect the shadow effect. As discussed above with respect to the touch signal extraction process, the difference between the number of activated touch nodes in different sectors of the touch signal may be used to characterize the touch signal asymmetry.

Clarifications Regarding Terminology

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

It should be understood that any reference to an element herein using a designation such as "first," "second," and so forth does not generally limit the quantity or order of those elements. Rather, these designations may be used herein as a convenient wireless device of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

It is noted that examples may be described as a process, which is depicted as a flowchart, a flow diagram, a finite state diagram, a structure diagram, or a block diagram. Although a flowchart may describe operations as a sequential process, many of the operations can be performed in parallel, or concurrently, and the process can be repeated. In addition, the order of operations may be re-arranged. A process may be deemed to be terminated when its operations are completed. A process may correspond to a method, a function, a procedure, a subroutine, a subprogram, etc. When a process corresponds to a software function, its termination may correspond to a return of the function to the calling function or the main function. A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of reducing shadow effects in a touch system, the method comprising:
   receiving a touch input on a touch interface from a finger or a stylus, wherein receiving a touch input comprises receiving touch signals from a plurality of sensor nodes of the touch interface, the touch signals including information from each of the plurality of sensor nodes representing an x position value, a y position value, and an amplitude of the touch input;
   determining an arithmetic mean of the touch input, the arithmetic mean indicating a first estimated touch position of the touch input on the touch surface;
   determining a weighted mean of the touch input, wherein the weighted mean is determined in part by applying a higher weight to the touch signals having a higher amplitude, the weighted mean indicating a second estimated touch position of the touch input on the touch interface;
   determining a difference between the weighted mean of the touch input and the arithmetic mean of the touch input; and
   adjusting the second estimated touch position of the touch input to a final estimated touch position based on the difference.

2. The method of claim 1, wherein adjusting the second estimated touch position comprises adjusting one or more of the x position value, the y position value, and the amplitude of the second estimated touch position to the final estimated touch position based on the difference between the weighted mean of the touch input and the arithmetic mean of the touch input.

3. The method of claim 2, wherein adjusting the second estimated touch position to the final estimated touch position comprises adjusting the second estimated touch position to the value of a centroid when the difference is below a first threshold and to a value based on the difference when the difference is equal to or above the first threshold.

4. The method of claim 1, further comprising
   identifying a maximum amplitude of the touch input of the received touch signals.

5. The method of claim 1, wherein the touch interface is divided into a plurality of sectors by sector divisions to determine which sectors of the touch interface contain shadow effects of the touch input.

6. The method of claim 5, wherein the sector divisions pass through one of a sensor node located closest to the weighted mean of the touch input or the arithmetic mean of the touch input.

7. The method of claim 5, wherein the touch interface is divided into sectors by sector divisions that pass through a sensor node of the touch interface having a maximum touch signal strength as compared to the touch signal strengths of all of the sensor nodes in the touch input.

8. The method of claim 5, further comprising:
   sorting the touch signals in a descending order list such that the touch signal with the highest value occurs first in the list;
   determining a maximum value of the touch signals and adding the maximum value to an extracted touch signal;
   sampling the touch signals at sensor nodes adjacent to the maximum value and including the one or more neighboring signals in the extracted touch signal if an amplitude of the sampled signal is above a second threshold; and
   sampling the touch signals at sensor nodes adjacent to the maximum value and including the one or more neighboring signals in the extracted touch signal until one of a number of sampled signals reach a third threshold, a value of the touch signal is below a fourth threshold, and a value of the touch signal is below a first threshold.

9. The method of claim 8, further comprising discontinuing sampling when a difference between a value of one of the touch signals and values of neighboring touch signals is below a fifth threshold or when the number of signals in the extracted touch signal exceeds a predetermined threshold.

10. An apparatus for filtering a touch input, comprising:
    a processor;
    a touch device; and
    a memory, operably coupled to the processor, and configured to store processor instructions that configure the processor to:
    receive a touch input on a touch interface from a finger or a stylus, wherein receiving a touch input comprises receiving touch signals from a plurality of sensor nodes of the touch interface, the touch signals including information from each of the plurality of sensor nodes representing an x position value, a y position value, and an amplitude of the touch input;
    determine an arithmetic mean of the touch input, the arithmetic mean indicating a first estimated touch position of the touch input on the touch surface;
    determine a weighted mean of the touch input, wherein the weighted mean is determined in part by applying a higher weight to the touch signals having a higher amplitude, the weighted mean indicating a second estimated touch position of the touch input on the touch interface;
    determine a difference between the weighted mean of the touch input and an arithmetic mean of the touch input; and adjust the second estimated touch position of the touch input to a final estimated position based on the difference.

11. The apparatus of claim 10, wherein the memory is further configured to store processor instructions that configure the processor to adjust one or more of the x position value, the y position value, and the amplitude of the second estimated touch position to the final estimated position based on the difference.

12. The apparatus of claim 11, wherein adjusting the second estimated touch position to the final estimated touch position comprises adjusting the second estimated touch position to the value of the weighted mean when the difference is below a first threshold and to a value based on the difference when the difference is equal to or above the first threshold.

13. The apparatus of claim 10, wherein the memory further is configured to store processor instructions that configure the processor to:
identify a maximum amplitude of the touch input of the plurality of touch signals.

14. The apparatus of claim 13 wherein the touch interface is divided into a plurality of sectors by sector divisions to determine which sectors of the touch interface contain shadow effects of the touch input.

15. The apparatus of claim 14, wherein the sector divisions pass through one of a sensor node located closest to the weighted mean of the touch input or the arithmetic mean of the touch input.

16. The apparatus of claim 14, wherein the touch interface is divided into sectors by sector divisions that pass through a sensor node of the touch interface having a maximum touch signal strength as compared to the touch signal strengths of all of the sensor nodes in the touch input.

17. The apparatus of claim 14, wherein the memory further is configured to store processor instructions that configure the processor to:
sort the touch signals in a descending order list such that the touch signal with the highest value occurs first in the list;
determine a maximum value of the touch signals and adding the maximum value to an extracted touch signal;
sample the touch signals at sensor nodes adjacent to the maximum value and including the one or more neighboring signals in the extracted touch signal if an amplitude of the sampled signal is above a second threshold;
sample the touch signals at sensor nodes adjacent to the maximum value and including the one or more neighboring signals in the extracted touch signal until one of a number of sampled signals reach a third threshold, a value of the touch signal is below a fourth threshold, and a value of the touch signal is below a first threshold; and
discontinuing sampling when a difference between a value of one of the touch signals and values of neighboring touch signals is below a fifth threshold.

18. A system for filtering a touch input, comprising:
a control module configured to
receive a touch input on a touch interface from a finger or a stylus, wherein receiving a touch input comprises receiving touch signals from a plurality of sensor nodes of the touch interface, the touch signals including information from each of the plurality of sensor nodes representing an x position value, a y position value, and an amplitude of the touch input;
determine an arithmetic mean of the touch input, the arithmetic mean indicating a first estimated touch position of the touch input on the touch surface;
determine a weighted mean of the touch input, wherein the weighted mean is determined in part by applying a higher weight to the touch signals having a higher amplitude, the weighted mean indicating an estimated second touch position of the touch input on the touch interface;
determine a difference between the weighted mean of the touch input and an arithmetic mean of the touch input; and
adjust the second estimated touch position to a final estimated touch position of the touch input based on the difference.

19. The system of claim 18, wherein the control module is configured to adjust one or more of the x position value, the y position value, and the amplitude of the second estimated touch position based on the difference between the weighted mean of the touch input and an arithmetic mean of the touch input, and wherein adjusting the second estimated touch position comprises adjusting the second estimated touch position to the value of the weighted mean when the difference is below a first threshold and to a value based on the difference when the difference is equal to or above the first threshold.

20. The system of claim 18, wherein the control module is further configured to:
identify a maximum amplitude of the touch input of the plurality of touch signals.

21. The system of claim 20 wherein the touch interface is divided into a plurality of sectors by sector divisions to determine which sectors of the touch interface contain shadow effects of the touch input.

22. The system of claim 21, wherein the sector divisions pass through one of a sensor node located closest the weighted mean of the touch input, the arithmetic mean of the touch input, or a sensor node of the touch interface having a maximum touch signal strength as compared to the touch signal strengths of all of the sensor nodes in the touch input.

23. The system of claim 20, wherein the control module is further configured to:
sort the touch signals in a descending order list such that the touch signal with the highest value occurs first in the list;
determine a maximum value of the touch signals and adding the maximum value to an extracted touch signal;
sample the touch signals at sensor nodes adjacent to the maximum value and including the one or more neighboring signals in the extracted touch signal if an amplitude of the sampled signal is above a second threshold;
sample the touch signals at sensor nodes adjacent to the maximum value and including the one or more neighboring signals in the extracted touch signal until one of a number of sampled signals reach a third threshold, a value of the touch signal is below a fourth threshold, and a value of the touch signal is below a first threshold; and
discontinuing sampling when a difference between a value of one of the touch signals and values of neighboring touch signals is below a fifth threshold.

24. A non-transitory computer-readable medium storing instructions that, when executed, cause at least one physical computer processor to perform a method of reducing shadow effects in a touch system, the method comprising:

receiving a touch input on a touch interface from a finger or a stylus, wherein receiving a touch input comprises receiving touch signals from a plurality of sensor nodes of the touch interface, the touch signals including information from each of the plurality of sensor nodes representing an x position value, a y position value, and an amplitude of the touch input;

determining an arithmetic mean of the touch input, the arithmetic mean indicating a first estimated touch position of the touch input on the touch surface;

determining a weighted mean of the touch input, wherein the weighted mean is determined in part by applying a higher weight to the touch signals having a higher amplitude, the weighted mean indicating a second estimated touch position of the touch input on the touch interface;

determining a difference between the weighted mean of the touch input and the arithmetic mean of the touch input; and adjusting the second estimated touch position of the touch input to a final estimated touch position based on the difference.

25. The non-transitory computer-readable medium of claim 24, wherein adjusting the second estimated position of the touch input comprises adjusting one or more of the x position value, the y position value, and the amplitude of the second estimated touch position based on the difference between the weighted mean of the touch input and the arithmetic mean of the touch input, and adjusting the second estimated touch position comprises adjusting the second estimated touch position to the value of the weighted mean when the difference is below a first threshold and to a value based on the difference when the difference is equal to or above the first threshold.

26. The non-transitory computer-readable medium of claim 24, further comprising identifying a maximum amplitude of the touch input of the plurality of touch signals.

27. The non-transitory computer-readable medium of claim 26, wherein the touch interface is divided into a plurality of sectors by sector divisions to determine which sectors of the touch interface contain shadow effects of the touch input and wherein the sector divisions pass through one of a sensor node located closest to the weighted mean of the touch input, the arithmetic mean of the touch input, or a sensor node of the touch interface having a maximum touch signal strength as compared to the touch signal strengths of all of the sensor nodes in the touch input.

28. The non-transitory computer-readable medium of claim 26, further comprising:

sorting the touch signals in a descending order list such that the touch signal with the highest value occurs first in the list;

determining a maximum value of the touch signals and adding the maximum value to an extracted touch signal;

sampling the touch signals at sensor nodes adjacent to the maximum value and including the one or more neighboring signals in the extracted touch signal if an amplitude of the sampled signal is above a second threshold;

sampling the touch signals at sensor nodes adjacent to the maximum value and including the one or more neighboring signals in the extracted touch signal until one of a number of sampled signals reach a third threshold, a value of the touch signal is below a fourth threshold, and a value of the touch signal is below a first threshold; and discontinuing sampling when a difference between a value of one of the plurality of touch signals and values of neighboring touch signals is below a fifth threshold.

* * * * *